United States Patent Office 3,126,430
Patented Mar. 24, 1964

3,126,430
PRODUCTION OF CARBON MASSES
Michael Stuart Thomas Price, Wantage, England, assignor to United Kingdom Atomic Energy Authority, London, England
No Drawing. Filed Sept. 24, 1958, Ser. No. 762,903
Claims priority, application Great Britain Sept. 24, 1957
5 Claims. (Cl. 264—29)

The invention relates to the production of carbon masses, and the production of graphite therefrom.

In the manufacture of carbon masses, finely powdered carbon is mixed with a cokable binder, usually a fusible material such as pitch, and the plastic mixture is formed into shaped masses by moulding or extrusion. These shaped masses are then baked in a non-oxidizing atmosphere to coke the binder. Graphite may then be produced by heating the baked carbon masses to a graphitising temperature.

It is desirable to produce graphite of high density and low porosity for many purposes. When no pressure is applied to the shaped carbon masses during baking, fissures tend to develop in the baked carbon masses, and densities of only 1.6 to 1.65 gm./cc. are achieved in the final graphitised product. In the specification of British Patent No. 742,521, a method is described in which the shaped carbon masses are subjected to a compacting pressure during baking in a die having a moveable ram, the volatile products of baking being allowed to escape from the die. By this method, baked carbon masses are obtained which after graphitising have densities of up to 1.80 gm./cc.

In the specification of British Patent No. 759,160, another method is described in which the shaped carbon masses are confined within a substantially pressure-tight container during baking. By this method baked carbon masses are produced which contain a minimum of flaws, have high apparent densities, for example, 1.635 gm./cc., and after graphitising have moderately high densities, for example, 1.73 gm./cc. This method, however, has the disadvantages that the pressure build-up during baking, which is due to decomposition of the binder material to give volatile products, is not reproducible unless charges of identical mass and composition are used, the pressure does not reach its maximum and most effective value until decomposition is substantially complete, and the rate of rise in pressure becomes very rapid, and difficult to control as the temperature is raised above 300° C.

It is an object of the present invention to produce baked carbon masses having high apparent densities, i.e. at least 1.69 gm./cc. and the minimum of flaws and fissures, by a process which is easily controllable and adaptable to various charges.

It is a further object of the invention to produce graphite from baked carbon masses, which after graphitisation has a very high density, i.e. at least 1.75 gm./cc.

According to the present invention, the shaped plastic mass of powdered carbon and fusible cokable binder is subjected during baking to a constant pneumatic pressure, preferably at least 100 p.s.i.g. A suitable pressure is 180 p.s.i., but this may be varied according to conditions, for example the size of the shaped mass and the period of baking. Preferably the shaped mass is held in position within a container by packing tightly around it a refractory powder such as carbon grist, which will offer a high impedance to volatile products escaping from the shaped mass during baking and reduce the pressure gradient within the shaped mass.

The maximum baking temperature is preferably 800° to 1000° C., and the rate of heating is preferably not more than 6° C. per hour.

After baking, the carbon masses may be heated to a graphitising temperature, for example, 2000° to 3000° C. An impregnation treatment, for example, with pitch, may be interposed between baking and graphitising to increase the density of the final graphite product still further.

The following are examples of methods of carrying the invention into effect. One particular merit of the invention is the increased density of the baked carbon mass and therefore of the graphite produced therefrom, compared with a process in which baking is carried out at atmospheric pressure. Comparative results are given in each example to show this.

*Example I*

A well-mixed plastic mass consisting of 75% finely powdered, calcined coke, and 25% pitch of softening point 80° C. (the percentages being by weight), was loaded into a die, tamped under vacuum, and extruded at about 105° C. to give a rod of circular cross-section 4 inches in diameter having a density of 1.76 gm./cc. Billets 18 inches long were cut from this rod and twelve of such billets were loaded into a mild steel container and packed vertically in a carbon grist, consisting of granular coke powder, in such a way as to support each billet separately and insulated from other billets and the container wall. The container was adapted to be placed in a pressurised furnace and to be itself pressurised by a gas pressure connection, such that a pressure of the order of 180 p.s.i.g. could be maintained within the container and 185 p.s.i.g. within the furnace outside the container, providing a differential pressure of about 5 p.s.i. The billets were then baked in a non-oxidizing atmosphere, the pneumatic pressure of 180 p.s.i.g. being maintained substantially constant by suitable pneumatic control mechanism outside the furnace. The temperature was raised from 100° C. to 800° C. at the rate of 6° C. per hour and then held for 4 hours at 800° C. The resulting baked carbon masses had densities between 1.69 and 1.71 gm./cc. and were free from flaws and fissures. After graphitising in known manner at 2700° C., these carbon masses yielded high quality graphite bodies of average density 1.75 gm./cc. A similar mix extruded as described in this example and baked by the same method, but at atmospheric pressure, gave carbon masses with baked densities between 1.60 and 1.64 gm./cc. and an average graphitised density of only 1.66 gm./cc.

The coke used in the above example had a wide particle size distribution including particles over 1000 microns in diameter, and about 50% particles over 200 microns in diameter. A greater density can be achieved by using a mixture of particles of this order of size with very fine particles, e.g. less than 1 micron in diameter, as found in carbon blacks. Also, since coke particles are extremely porous, a greater density can be achieved by using ground artificial graphite in place of ground coke.

The following example shows that, even when both these effects are made use of, an improvement in density can be achieved by pressure baking by the method of the invention.

*Example II*

Two parts of ground and blended graphite powder, produced from nuclear reactor grade graphite of density 1.7 to 1.8 gm./cc., was mixed thoroughly with one part of medium thermal carbon black. The graphite powder consisted of particles, substantially all of which were less than 1000 microns in diameter but about 60% of which were over 100 microns in diameter, and the carbon black had an average particle diameter of 0.3 microns. The mixture was then mixed with pitch at the rate of 79% by weight of the mixed powders to 21% pitch, the pitch being the same as that used in Example I. The final mix was then loaded into a die, tamped under vacuum and extruded at 140° C. to give a rod of circular cross-section 2¾ inches in diameter having a density of 1.81 gm./cc. Billets 19 inches long were cut from this rod, loaded into the container and packed in carbon grist, as in Example I. The billets were baked in a non-oxidizing atmosphere at a pneumatic pressure of 100 p.s.i.g. maintained substantially constant throughout the following heating cycle: the temperature was raised to 300° C. at a rate of 6° per hour, held at 300° C. for 12 hours, raised to 600° C. at a rate of 3° per hour, raised to 800° C. at a rate of 6° per hour, and held at 800° C. for 4 hours. The resulting baked carbon masses were crack-free and had a density of 1.78 gm./cc. After graphitising at 2700° C., these carbon masses yield high quality graphite bodies of average density 1.88 gm./cc. A similar mix extruded as described in this example and baked by the same method, but at atmospheric pressure, gave carbon masses which had an average density of only 1.73 gm./cc. and were badly cracked longitudinally, and after graphitising had an average density of only 1.81 gm./cc. Similar carbon bodies, baked under pneumatic pressures of 150 p.s.i.g. and 180 p.s.i.g. showed no significant improvement over those baked at 100 p.s.i.g.

A further improvement in the density of graphite bodies produced by the method of the invention can be attained by impregnating the baked carbon masses, e.g. with pitch, before the graphitising step. An increase in density of about 0.08 gm./cc. can be thereby achieved.

I claim:

1. A method of producing a baked carbon mass of high density, which comprises the steps of forming a shaped plastic mass of powdered carbon and a fusible cokable binder, supporting the plastic mass in the unbaked condition in a container, supplying a non-oxidizing gas to the container under a super-atmospheric pressure of at least 100 p.s.i.g., and heating the plastic mass in the container to bake said mass by coking said binder, the pressure of said gas being maintained substantially constant throughout the said heating step.

2. A method according to claim 1, in which said pressure is 180 p.s.i.g.

3. A method according to claim 1, in which the maximum baking temperature is 800° C.

4. A method according to claim 3, in which the rate of heating to the maximum temperature is never greater than 6° C. per hour during said heating.

5. A method of producing a graphite body of high density, which comprises the steps of forming a shaped plastic mass of powdered carbon and a fusible cokable binder, supporting the plastic mass in the unbaked condition in a container, supplying a non-oxidizing gas to the container under a super-atmospheric pressure of at least 100 p.s.i.g. and heating the plastic mass in the container to bake said mass by coking said binder, the pressure of said gas being maintained substantially constant throughout said heating step, and then heating the baked mass to a graphitising temperature.

References Cited in the file of this patent

UNITED STATES PATENTS

| | | |
|---|---|---|
| 2,376,760 | Elsey | May 22, 1945 |
| 2,461,365 | Bennett et al. | Feb. 8, 1949 |
| 2,493,383 | Bennett et al. | Jan. 3, 1950 |
| 2,883,708 | Sem | Apr. 28, 1959 |